United States Patent [19]

Renk

[11] Patent Number: 5,380,792

[45] Date of Patent: Jan. 10, 1995

[54] TWO-COMPONENT AQUEOUS POLYURETHANE DISPERSIONS HAVING IMPROVED POT LIFE AND COATINGS PREPARED THEREFROM

[75] Inventor: Christine A. Renk, Pittsburgh, Pa.

[73] Assignee: Miles Inc., Pittsburgh, Pa.

[21] Appl. No.: 48,850

[22] Filed: Apr. 19, 1993

[51] Int. Cl.6 .................. C08G 18/06; C08G 18/28
[52] U.S. Cl. ................... 524/840; 524/873; 528/60
[58] Field of Search ............... 528/60; 524/840, 873

[56] References Cited

U.S. PATENT DOCUMENTS 5,075,370 12/1991 Kubitza et al. ................... 524/591
5,124,427 6/1992 Potter et al. ....................... 528/67
5,200,489 4/1993 Jacobs et al. ...................... 528/49

*Primary Examiner*—John Kight, III
*Assistant Examiner*—Jeffrey Culpeper Mullis
*Attorney, Agent, or Firm*—Joseph C. Gil; Thomas W. Roy

[57] ABSTRACT

The present invention relates to two-component, aqueous polyurethane coating compositions which may be cured at ambient temperature and which contain I) a polyisocyanate mixture having an NCO content of 10 to 47% by weight and containing isocyanurate and allophanate groups in a molar ratio of monoisocyanurates to monoallophanates of 10:1 to 1:5, wherein the allophanate groups are formed from urethane groups which are based on the reaction product of an organic diisocyanate having (cyclo)aliphatically bound isocyanate groups and a monoalcohol containing at least 1 carbon atom and having a molecular weight of up to 500, and II) a water dispersible or water soluble polyol, wherein components I and II are present in an amount sufficient to provide an equivalent ratio of isocyanate groups to hydroxyl groups of 0.8:1 to 6:1.

The present invention is also directed to the coatings prepared from these coating compositions.

16 Claims, No Drawings

TWO-COMPONENT AQUEOUS POLYURETHANE DISPERSIONS HAVING IMPROVED POT LIFE AND COATINGS PREPARED THEREFROM

FIELD OF THE INVENTION

The present invention relates to two-component aqueous polyurethane dispersions which have an improved pot life and may be cured at ambient temperature, and to the coatings prepared therefrom which have excellent hardness, flexibility, solvent resistance and surface appearance.

BACKGROUND OF THE INVENTION

Two-component, aqueous polyurethane coating compositions are known and have been described in U.S. Pat. No. 5,075,370 and in copending applications, U.S. Ser. Nos. 7/644,180, 07/820,172 and 07/842,866. These coating compositions contain polyisocyanates, which may either be hydrophobic or hydrophilic, in combination with water dispersible or water soluble polyols. It has surprisingly been found that even though water is present in a substantial molar excess in comparison to the polyol, that it is possible to obtain coatings which have an excellent surface appearance, i.e., the coating does not contain bubbles from the generation of carbon dioxide from the reaction between isocyanate groups and water.

One of the disadvantages of these systems is that after preparation of the coating composition and prior to its application to a substrate, the isocyanate groups do react with water. This results in the formation of carbon dioxide which initially is present in the system in dissolved form, i.e., as carbonic acid. However, continued generation of carbon dioxide exceeds the amount which can present in dissolved form. This causes foaming in the coating composition and makes it difficult to obtain high quality coatings.

Accordingly, it is an object of the present invention to provide aqueous polyurethane dispersions which have an improved pot life and which may be cured at ambient temperature to provide coatings which possess the properties obtainable from prior art two-component, aqueous coating compositions.

This object may be achieved in accordance with the present invention as set forth hereinafter by the use of two-component coating compositions wherein one component is a water dispersible or water soluble polyol and the other an unblocked polyisocyanate which is neither water soluble nor water dispersible and which contains both isocyanurate groups and allophanate groups.

The use of polyisocyanates which are not water soluble or water dispersible has been described in U.S. Pat. No. 5,075,370 and in copending application, U.S. Ser. No. 07/820,172. However, neither of these references recognize that it would be possible to increase the pot-life of the coating composition by using polyisocyanates which contain isocyanurate groups and allophanate groups.

SUMMARY OF THE INVENTION

The present invention relates to two-component, aqueous polyurethane coating compositions which may be cured at ambient temperature and which contain I) a polyisocyanate mixture having an NCO content of 10 to 47% by weight and containing isocyanurate and allophanate groups in a molar ratio of monoisocyanurates to monoallophanates of 10:1 to 1:5, wherein the allophanate groups are formed from urethane groups which are based on the reaction product of an organic diisocyanate having (cyclo)aliphatically bound isocyanate groups and a monoalcohol containing at least 1 carbon atom and having a molecular weight of up to 500, and II) a water dispersible or water soluble polyol, wherein components I and II are present in an amount sufficient to provide an equivalent ratio of isocyanate groups to hydroxyl groups of 0.8:1 to 6:1.

The present invention is also directed to the coatings prepared from these coating compositions.

DETAILED DESCRIPTION OF THE INVENTION

In accordance with the present invention the term "monoisocyanurate" means a polyisocyanate containing one isocyanurate group and formed from three diisocyanate molecules, and the term "polyisocyanurate" means a polyisocyanate containing more than one isocyanurate group. The term "monoallophanate" means a polyisocyanate containing one allophanate group and formed from two diisocyanate molecules and 1 monoalcohol molecule, and the term "polyallophanate" means a polyisocyanate containing more than one allophanate group. The term "(cyclo)aliphatically bound isocyanate groups" means aliphatically and/or cycloaliphatically bound isocyanate groups.

Examples of suitable diisocyanates to be used as starting materials for preparing the polyisocyanates containing isocyanurate and allophanate groups are organic diisocyanates represented by the formula R(NCO)

wherein R represents an organic group obtained by removing the 20, . isocyanate groups from an organic diisocyanate having (cyclo)aliphatically bound isocyanate groups and a molecular weight of 112 to 1,000, preferably 140 to 400. Preferred diisocyanates for the process according to the invention are those represented by the above formula wherein R represents a divalent aliphatic hydrocarbon group having from 4 to 18 carbon atoms, a divalent cycloaliphatic hydrocarbon group having from 5 to 15 carbon atoms or a divalent araliphatic hydrocarbon group having from 7 to 15 carbon atoms. Examples of the organic diisocyanates which are particularly suitable for the process include 1,4-tetramethylene diisocyanate, 1,6-hexamethylene diisocyanate, 2,2,4-trimethyl-1, 6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)-methane, 1,3- and 1,4-bis(isocyanatomethyl)-cyclohexane, bis-(4-isocyanato-3-methyl-cyclohexyl)-methane, α,α,α',α'-tetramethyl -1,3- and/or -1,4-xylylene diisocyanate, 1-isocyanato-1-methyl-4(3)-isocyanatomethyl cyclohexane, xylylene diisocyanate, and 2,4- and/or 2,6-hexahydrotoluylene diisocyanate. Mixtures of diisocyanates may also be used. Preferred diisocyanates are 1,6-hexamethylene diisocyanate, isophorone diisocyanate and bis-(4-isocyanatocyclohexyl)- methane. 1,6-hexamethylene diisocyanate (HDI) is especially preferred.

It is also possible in accordance with the present invention to use blends of the previously mentioned diisocyanates with monoisocyanates or polyisocyanates having 3 or more isocyanate groups, provided that the isocyanate groups are (cyclo)aliphatically bound.

Urethane groups and subsequently allophanate groups are incorporated into the polyisocyanates by the use of aliphatic, cycloaliphatic, araliphatic or aromatic monoalcohols. The monoalcohols may be linear, branched or cyclic, contain at least one carbon atom and have a molecular weight of up to 500. The monoalcohols may optionally contain other hetero atoms in the form of, e.g., ether groups. The molar ratio of monoalcohol to diisocyanate is about 0.001 to 0.5, preferably about 0,004 to 0.2. Preferred monoalcohols are hydrocarbon monoalcohols.

The hydrocarbon monoalcohols preferably contain 1 to 36, more preferably 1 to 20 carbon atoms. Examples of suitable monoalcohols include methanol, ethanol, n-propanol, isopropanol, n-butanol, isobutanol and tert. butanol, n-pentanol, 2-hydroxy pentane, 3-hydroxy pentane, the isomeric methyl butyl alcohols, the isomeric dimethyl propyl alcohols, neopentyl alcohol, n-hexanol, n-heptanol, n-octanol, n-nonanol, 2-ethyl hexanol, trimethyl hexanol, cyclohexanol benzyl alcohol, phenol, the cresols, the xylenols, the trimethylphenols, decanol, dodecanol, tetradecanol, hexadecanol, octadecanol, 2,6,8-trimethylnonanol, 2-t-butyl-cyclohexanol, 4-cyclohexyl-1-butanol, 2,4,6,-trimethyl benzyl alcohol, branched chain primary alcohols and mixtures thereof (which are available from Henkel under to Standamul trademark) and mixtures of linear primary alcohols (which are available from Shell under the Neodol trademark).

Preferred ether-containing monoalcohols include ethoxy methanol, methoxy ethanol, ethoxy ethanol, the isomeric methoxy or ethoxy propanols, the isomeric propoxy methanols and ethanols, the isomeric methoxy butanols, the isomeric butoxy methanols, furfuralcohol and other monoalcohols which have a molecular weight of up to 500, preferably up to 250 and are based on ethylene oxide, propylene oxide and/or butylene oxide.

It is also possible in accordance with the present invention to use mixtures of the previously described monoalcohols.

The polyisocyanates according to the invention may also be prepared by blending polyisocyanates containing isocyanurate groups with monoallophanates.

Suitable catalysts for preparing the polyisocyanates containing isocyanurate and allophanate groups and methods for the production of these polyisocyanates are described in U.S. Pat. No. 5,124,427 (the disclosure of which is herein incorporated by reference) and in co-pending applications, U.S. Ser. Nos. 07/733,549, 07/733,566 and 07/771,086, now all abandoned (the disclosures of which is herein incorporated by reference).

At a temperature of about 60° C. and in the presence of the required catalyst or catalyst solution the trimerization begins and is indicated by an exothermic reaction. As the reaction temperature increases the conversion rate of urethane groups to allophanate groups increases faster than the formation of isocyanurate groups. Accordingly, at some temperature for a given degree of trimerization, the urethane groups are substantially converted to allophanate groups, while at some lower temperature unreacted urethane groups remain. The progress of the reaction is followed by determining the NCO content by a suitable method such as titration, refractive index or IR analysis. Thus, the reaction may be terminated at the desired degree of trimerization. The termination of the trimerization reaction can take place, for example, at an NCO content of about 15% to 47%, preferably about 20 to 40%.

The working-up of the reaction mixture, optionally after previous separation of insoluble catalyst constituents, may take place in various ways depending upon how the reaction was conducted and the area of application for the isocyanates. It is possible to use the polyisocyanates according to the invention which have been produced in solution directly as a lacquer raw material, without a purification stage, if it is not necessary to reduce the free monomer content. Any solvent used during trimerization reaction and any unreacted monomer present in the polyisocyanate product can also be removed by distillation in known manner. The product generally contains a total of less than 2, preferably less than 1% of free (unreacted) monomeric diisocyanates. The products according to the invention generally range from viscous liquids to solids.

The polyisocyanates containing isocyanurate groups and allophanate groups may also contain residual urethane groups which have not been converted to allophanate groups depending upon the temperature maintained during the reaction and the degree of isocyanate group consumption. The ratio of monoisocyanurate groups to monoallophanate groups present in the polyisocyanates according to the invention is about 10:1 to 1:5, preferably about 5:1 to 1:2.

Suitable polyols for use in accordance with the present invention are those which are either water dispersible or water soluble. The polyols generally have a molecular weight (as determined by end group analysis) of 400 to 10,000, preferably 1000 to 6000, contain two or more hydroxyl groups and may contain anionic, cationic or non-ionic groups in order to provide dispersibility or solubility. In a less preferred embodiment the polyols may be rendered water soluble or dispersible in the presence of an external emulsifier. Examples of these aqueous resins include aqueous solutions or dispersions of copolymers prepared from olefinically unsaturated monomers and other water dispersible or water soluble polyhydroxyl compounds (including those containing urethane and/or urea groups), such as polyhydroxyl polyesters, polylactones, polycarbonates, polyethers, polythioethers, polyacetals, polyether esters, polyester amides and polyamides which are known from polyurethane chemistry. Examples of these polyhydroxyl compounds are disclosed in U.S. Patent 4,925,885, the disclosure of which is herein incorporated by reference.

Suitable dispersions or solutions of copolymers prepared from olefinically unsaturated monomers include known solutions or dispersions prepared at least in part from (meth)acrylic acid and hydroxyalkyl esters of either of these acids having 1 to 18, preferably 1 to 4 carbon atoms, in the alkyl group. Other non-functional monomers which may be used for preparing the copolymers are known and include esters of the (meth)acrylic acid and vinyl compounds such as styrene. Suitable aqueous acrylic resins have been described in U.S. Pat. No. 5,075,370, the disclosure of which is herein incorporated by reference.

Among the preferred polyols are hydroxy functional polyurethanes which have an average hydroxy functionality of at least 2, preferably 2 to 8, more preferably 2 to 6 and most preferably 2.5 to 6; a total content of urethane and urea groups of 1 to 20% by weight, preferably about 3 to 17% by weight; and an average hydroxy equivalent weight (which may be calculated by an end group analysis) of about 200 to 5000, preferably 500 to 4000 and more preferably 1000 to 3000.

The hydroxy functional polyurethanes are based on the reaction product of organic polyisocyanates (which have previously been described for the preparation of polyisocyanate mixtures) with the previously described high molecular weight polyols, optionally low molecular weight, isocyanate-reactive compounds, and at least one of isocyanate-reactive compounds which contain ionic or potential ionic groups and/or isocyanate-reactive compounds containing nonionic hydrophilic groups. The reactants and their amounts are selected to ensure that the resulting polyurethane is hydroxy functional. Examples of suitable compounds for preparing the hydroxy functional polyurethanes are described in copending application, U.S. Ser. No. 07/644,180, now abandoned herein incorporated by reference.

The hydroxy functional polyurethanes have a content of chemically incorporated anionic groups of 0 to 200, preferably 10 to 200, more preferably 10 to 180 and most preferably 20 to 100 milliequivalents per 100 g of solids, and a content of chemically incorporated nonionic groups of 0 to 25% by weight. When compounds containing hydrophilic ethylene oxide units are used, they are preferably incorporated into the hydroxy functional polyurethanes in an amount sufficient to provide a content of hydrophilic ethylene oxide units of greater than 1% by weight, more preferably greater than 3% by weight, based on the weight of the hydroxy functional polyurethane. The upper limit for the content of the hydrophilic ethylene oxide units is preferably 10% by weight, more preferably 7% by weight, based on the weight of the hydroxy functional polyurethane. The amounts of the anionic groups and hydrophilic ethylene oxide units must be sufficient for the hydroxy functional polyurethane to remain stably dispersed in water, unless an external emulsifier is also used.

The polyisocyanate mixtures should not be blended with water dispersible or water soluble polyol until it is time to apply the coating composition to a suitable substrate. As with two-component, solvent-based coating compositions, the mixture of the coreactants has a limited useful potlife, which is dependent upon the reactivity of the coreactants, ratios of coreactants and catalysts present in the system. However, by using polyisocyanates containing isocyanurate groups and allophanate groups as the polyisocyanate component, it is possible to increase the useful potlife of the coating composition.

When it is desired to blend the two components, the water dispersible polyisocyanate may simply be added to the aqueous polyol with minimal agitation. Methods for blending the two components are known in the art. If necessary, the polyisocyanate may be blended with an organic solvent to assist in dispersing the polyisocyanate. Subsequently, the solvent may be removed, e.g., by distillation, or it may remain in the coating composition.

Coatings prepared from the aqueous coating compositions according to the present invention are distinguished by excellent hardness, flexibility, solvent resistance and surface appearance.

The two components should be blended in amounts sufficient to provide a ratio of isocyanate groups from the polyisocyanate mixture to hydroxy groups from the polyol of 0.8:1 to 6:1, preferably about 1.2:1 to 4:1. After the two components have been blended the coating composition should have a solids content of about 2 to 60%, preferably about 10 to 50% by weight.

The aqueous coating compositions according to the present invention may be applied to substrates using any of the various techniques known in the art. They can also contain pigments, levelling agents, catalysts, and other auxiliaries known in the art. Examples of the application techniques and additives are set forth in U.S. Pat. No. 4,408,008, which is herein incorporated by reference.

The invention is further illustrated but is not intended to be limited by the following examples in which all parts and percentages are by weight unless otherwise specified.

EXAMPLES

Polyisocyanate Mixture A

To a 500 ml 3-neck flask equipped with a gas bubbler, mechanical stirrer, thermometer and condenser were added 301.7 grams of hexamethylene diisocyanate and 13.3 grams of 1-butanol. Dry nitrogen was bubbled through the stirred reaction mixture while it was heated at 60° C. When the urethane reaction was complete (about 1 hour), the temperature was raised to 90° C. To the reaction mixture at 90° C. were added 0.214 parts of a 4.4% solution of trimethylbenzylammonium hydroxide dissolved in 1-butanol. The reaction temperature was maintained at 90° to 100° C. When the reaction mixture reached NCO contents of 40.1% and 37.0%, an additional 0.12 parts of the catalyst solution was added. When the reaction mixture reached an NCO content of 34.8%, the reaction was stopped by adding 0.214 parts of di-(2-ethylhexyl) phosphate. The excess monomer was removed by thin film evaporation to provide an almost colorless, clear liquid having a viscosity of 630 mPa.s (25° C.), an NCO content of 19.7%, and a free monomer (HDI) content of 0.35%. The yield was 48.6%. The yield was calculated by determining the percentage of free hexamethylene diisocyanate in the product prior to distillation.

Comparison Polyisocyanate B

A mixture of 70 parts by weight of a uretdione group-containing polyisocyanate prepared by dimerizing hexamethylene diisocyanate and 30 parts by weight of N,N',N''-tris-(6-isocyanatohexyl)-isocyanurate prepared by trimerizing hexamethylene diisocyanate together with minor quantities of higher homologs of both products. In its 100% solvent free form, the polyisocyanate had an average viscosity of 150 mPa.s at 23° C. and an average free isocyanate group content of 22.5%.

Polyol A

A mixture of 119.8 parts of a polyester diol prepared from adipic acid and neopentyl glycol (OH number 56), 4.6 parts of a polyether monohydric alcohol having an OH number of 26.2 and prepared from n-butanol, ethylene oxide, and propylene oxide (molar ratio of ethylene oxide to propylene oxide-83:17), 18.4 parts of 2,2- butylethyl-propane diol, 18.5 parts of α,α dimethylolpropionic acid, and 60 parts of N-methylpyrrolidinone was heated to 70° C. with stirring. To this mixture, 85.9 parts of 4,4'-dicyclohexylmethane diisocyanate and 24.3 parts of isophorone diisocyanate were added, and the resulting mixture was stirred and heated at 110° C. for 2 hours until the theoretical isocyanate content of 3.0% was reached. The reaction was cooled to 70° C., and 14.0 parts of triethylamine were added. After stirring for 15 minutes at 70° C., 14.4 parts of diethanolamine and 10 parts of N-methylpyrrolidinone were added. After the reaction exothermed to 92° C., the mixture was cooled to 70° C. and stirred until it was found to be NCO-free by IR. 4.6 parts of the above polyether monohydric alcohol in 10 parts of N-methylpyrrolidone were added, and the reaction mixture was stirred for 30 minutes. 331 parts of distilled water at 50° C. were added to the mixture and the resulting dispersion was stirred for one hour.

pH—7.4
Solids—40%
Viscosity (25° C.)≈300 mPa.s
OH equivalent weight≈2400

Preparation of a two-component coating composition

A two-component aqueous polyurethane coating composition was prepared using the following ingredients:

Formulation A: (According to the invention)

67.4 parts of Polyol A,
11.7 parts of Polyisocyanate mixture A,
0.08 parts of a fluorocarbon surfactant (FC-430, available from 3M), 5% in deionized water, and
20.8 parts of deionized water.

Formulation B: (Comparison)

70.4 parts of Polyol A,
10.4 parts of Comparison Polyisocyanate B
0.08 parts of a fluorocarbon surfactant (FC-430, available from 3M, 5% in deionized water, and
19.1 parts of deionized water.

Formulations A and B were both formulated at an NCO:OH equivalent ratio of 2:1, and solids content of 40%.

Formulation A and B were tested for the following performance characteristics: Films were drawn down at 90 μm and dry times were tested in accordance with ASTM D1640-83 (Powder method). Sand dry was determined by placing a strip of sand on the sample and tilting it to 90°. Sand dry was achieved when the sand fell off the sample or could be brushed off without leaving any sand on the panel. Hard dry was achieved when a hard pressed thumb print did not leave a mark on the panel. Table 1 sets forth the results.

Film hardness for each formulation was tested in accordance with ASTM D4366-87 (Koenig Pendulum Hardness). The films were drawn down at 90 μm and were tested after the films stood for 1 day and 1 week. Results are set forth in Table 1.

TABLE 1

| | Fomulation A | Fomulation B (Comp) |
|---|---|---|
| Sand Dry (hrs) | 2.8 | 3.2 |
| Hard Dry (hrs) | >6 | >6 |
| Pot Life (hrs) | >7 | 4 |
| Pendulum Hardness (sec) | | |

TABLE 1-continued

| | Fomulation A | Fomulation B (Comp) |
|---|---|---|
| 1 day | 69 | 56 |
| 7 days | 123 | 102 |

In comparing the potlives of formulation A and comparison formulation B, it is surprising that even though both Polyisocyanate Mixture A and Comparison Polyisocyanate B are hydrophobic in nature, Polyisocyanate Mixture A provided a coating composition which did not foam even after seven hours. The system based on Comparison Polyisocyanate B foamed after four hours. The foaming is caused by the release of carbon dioxide. The carbon dioxide which is generated initially remains dissolved in the composition; after the composition becomes supersaturated, the gas is released.

Since it was unexpected that Polyisocyanate Mixture A showed less of a tendency to react with water in a formulated coating, both formulation A and B were titrated for isocyanate consumption per ASTM D2572-87 (NCO content) using a Metrohm 6822 Titroprocesser. In formulation B the percent NCO was significantly reduced after 4-5 hours as is evidenced by the release of carbon dioxide. The percent NCO for formulation A did not drop off significantly even after seven hours. No visible signs of carbon dioxide generation were apparent. The results of the titration are set forth in Table 2.

TABLE 2

| | Formulation | |
|---|---|---|
| Titration Data - % (NCO) | A | Fomulation B (Comp) |
| Initial | 1.69 | 1.63 |
| 1 hr. | 1.58 | 1.36 |
| 2 hrs. | 1.49 | 1.33 |
| 3 hrs. | 1.45 | 0.85 |
| 4 hrs. | 1.37 | 0.68* |
| 4.5 hrs. | 1.30 | 0.23 |
| 5 hrs. | 1.22 | |
| 7 hrs. | 1.01 | |

*Foaming occurs due to release of $CO_2$ gas.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two-component, aqueous polyurethane coating composition which may be cured at ambient temperature and which comprises
   I) a polyisocyanate component which is neither water dispersible nor water soluble which comprises a polyisocyanate mixture having an NCO content of 10 to 47% by weight and containing isocyanurate and allophanate groups in a molar ratio of monoisocyanurates to monoallophanates of 10:1 to 1:5, wherein the allophanate groups are formed from urethane groups which are based on the reaction product of an organic diisocyanate having aliphatically and/or cycloaliphatically bound isocyanate groups and a monoalcohol containing at least 1 carbon atom and having a molecular weight of up to 500, and
   II) a polyol which is dispersed or dissolved in water, wherein components I and II are present in an amount sufficient to provide an equivalent ratio of isocyanate groups to hydroxyl groups of 0.8:1 to 6:1.

2. The coating composition of claim 1 wherein said organic diisocyanate comprises 1,6-hexamethylene diisocyanate.

3. The coating composition of claim 1 wherein said polyisocyanate mixture has a viscosity of less than 1300 mPa.s at 25° C.

4. The coating composition of claim 2 wherein said polyisocyanate mixture has a viscosity of less than 1300 mPa.s at 25° C.

5. A two-component, aqueous polyurethane coating composition which may be cured at ambient temperature and which comprises I) a polyisocyanate component which is neither water dispersible nor water soluble which comprises a polyisocyanate mixture having an NCO content of 10 to 47% by weight and containing isocyanurate and allophanate groups in a molar ratio of monoisocyanurates to monoallophanates of 10:1 to 1:5, wherein the allophanate groups are formed from urethane groups which are based on the reaction product of an organic diisocyanate having aliphatically and/or cycloaliphatically bound isocyanate groups and a monoalcohol containing at least 1 carbon atom and having a molecular weight of up to 500, and II) a water dispersible or water soluble polyol which comprises an aqueously dispersed polyurethane wherein said polyurethane has a) an average hydroxy functionality of 1.8 to 8, b) a total content of urethane and urea groups, calculated as —NH—C—O—, of 1 to 20% by weight, based on the weight of said polyurethane, c) 0 to 200 milliequivalents of chemically incorporated anionic groups per 100 g of polyurethane and d) 0 to 25% by weight, based on the weight of said polyurethane, of ethylene oxide units incorporated within terminal and/or lateral polyether chains, wherein components c) and d) are present in an amount which is sufficient to maintain the polyurethane stably dispersed in water, and wherein components I and II are present in an amount sufficient to provide an equivalent ratio of isocyanate groups to hydroxyl groups of 0.8:1 to 6:1.

6. The coating composition of claim 5 wherein said organic diisocyanate comprises 1,6-hexamethylene diisocyanate.

7. The coating composition of claim 5 wherein said polyisocyanate mixture has a viscosity of less than 1300 mPa.s at 25° C.

8. The coating composition of claim 6 wherein said polyisocyanate mixture has a viscosity of less than 1300 mPa.s at 25° C.

9. A coating prepared from a two-component, aqueous polyurethane coating composition which may be cured at ambient temperature and which comprises I) a polyisocyanate component which is neither water dispersible nor water soluble which comprises a polyisocyanate mixture having an NCO content of 10 to 47% by weight and containing isocyanurate and allophanate groups in a molar ratio of monoisocyanurates to monoallophanates of 10:1 to 1:5, wherein the allophanate groups are formed from urethane groups which are based on the reaction product of an organic diisocyanate having aliphatically and/or cycloaliphatically bound isocyanate groups and a monoalcohol containing at least 1 carbon atom and having a molecular weight of up to 500, and II) a polyol which is dispersed or dissolved in water, wherein components I and II are present in an amount sufficient to provide an equivalent ratio of isocyanate groups to hydroxyl groups of 0.8:1 to 6:1.

10. The coating of claim 9 wherein said organic diisocyanate comprises 1,6-hexamethylene diisocyanate.

11. The coating of claim 9 wherein said polyisocyanate mixture has a viscosity of less than 1300 mPa.s at 25° C.

12. The coating of claim 10 wherein said polyisocyanate mixture has a viscosity of less than 1300 mPa.s at 25° C.

13. A coating prepared from a two-component, aqueous polyurethane coating composition which may be cured at ambient temperature and which comprises I) a polyisocyanate component which is neither water dispersible nor water soluble which comprises a polyisocyanate mixture having an NCO content of 10 to 47% by weight and containing isocyanurate and allophanate groups in a molar ratio of monoisocyanurates to monoallophanates of 10:1 to 1:5, wherein the allophanate groups are formed from urethane groups which are based on the reaction product of an organic diisocyanate having aliphatically and/or cycloaliphatically bound isocyanate groups and a monoalcohol containing at least 1 carbon atom and having a molecular weight of up to 500, and II) a water dispersible or water soluble polyol which comprises an aqueously dispersed polyurethane wherein said polyurethane has a) an average hydroxy functionality of 1.8 to 8, b) a total content of urethane and urea groups, calculated as —NH—C—O—, of 1 to 20% by weight, based on the weight of said polyurethane, c) 0 to 200 milliequivalents of chemically incorporated anionic groups per 100 g of polyurethane and d) 0 to 25% by weight, based on the weight of said polyurethane, of ethylene oxide units incorporated within terminal and/or lateral polyether chains, wherein components c) and d) are present in an amount which is sufficient to maintain the polyurethane stably dispersed in water, and wherein components I and II are present in an amount sufficient to provide an equivalent ratio of isocyanate groups to hydroxyl groups of 0.8:1 to 6:1.

14. The coating of claim 13 wherein said organic diisocyanate comprises 1,6-hexamethylene diisocyanate.

15. The coating of claim 13 wherein said polyisocyanate mixture has a viscosity of less than 1300 mPa.s at 25° C.

16. The coating of claim 14 wherein said polyisocyanate mixture has a viscosity of less than 1300 mPa.s at 25° C.

* * * * *